UNITED STATES PATENT OFFICE.

IZIDOR BRANDEIS, OF UJVIDEK, AUSTRIA-HUNGARY, ASSIGNOR TO SIMON ROSENBAUM, OF UJVIDEK, AUSTRIA-HUNGARY.

PRESERVING COMPOUND.

1,107,892.

Specification of Letters Patent. Patented Aug. 18, 1914.

No Drawing. Application filed July 24, 1913. Serial No. 780,974.

*To all whom it may concern:*

Be it known that I, IZIDOR BRANDEIS, merchant, a subject of the King of Hungary, residing at 25 Szt. István Utca, Ujvidek, Austria-Hungary, have invented certain new and useful Improvements in Preserving Compounds, of which the following is a specification.

This invention has for its object a new compound, principally intended for the preservation of raw green food-stuffs.

According to my invention pure white alum, powdered mustard-seeds and salicylic acid in its commercial form are well mixed together. This mixture forms a powerful preserving compound for raw green food-stuffs, which compound keeps its preserving power for many years.

It is known that salicylic acid has a preserving capacity and is, therefore, commonly used for preserving purposes, but the disadvantage of salicylic acid is that it destroys the taste of the food-stuff when used in the required considerable quantity. By the combined use, however, of the three materials above referred to, the preserving efficiency is increased to such an extent that a comparatively small amount suffices for the preservation of food-stuffs, so that their taste will not be destroyed.

The compound may be produced in the following proportions: 45–50 parts by weight of alum, 30–35 parts by weight of mustard-seeds, and 15–25 parts by weight of salicylic acid, but these proportions may be varied more or less.

The compound thus produced is simply strewed in the receptacle containing the food-stuffs, after which the receptacle is sealed. For a receptacle having a volume of 5 liters, an amount of 8–10 grams of the compound is sufficient.

I claim as my invention:

A preserving compound consisting of a mixture of 45–50 parts by weight of pure white powdered alum, 30–35 parts by weight of powdered mustard seeds, and 15–25 parts by weight of salicylic acid.

In testimony whereof, I affix my signature in presence of two witnesses.

IZIDOR BRANDEIS.

Witnesses:
 FARAJÓ SÁNDOR,
 JOHN J. RONT.